INVENTOR.
ALBERT F. ROMANOWSKI
BY
*Albert L. Jeffers*
ATTORNEY

INVENTOR.
ALBERT F. ROMANOWSKI

BY *Albert L. Jeffers*

ATTORNEY

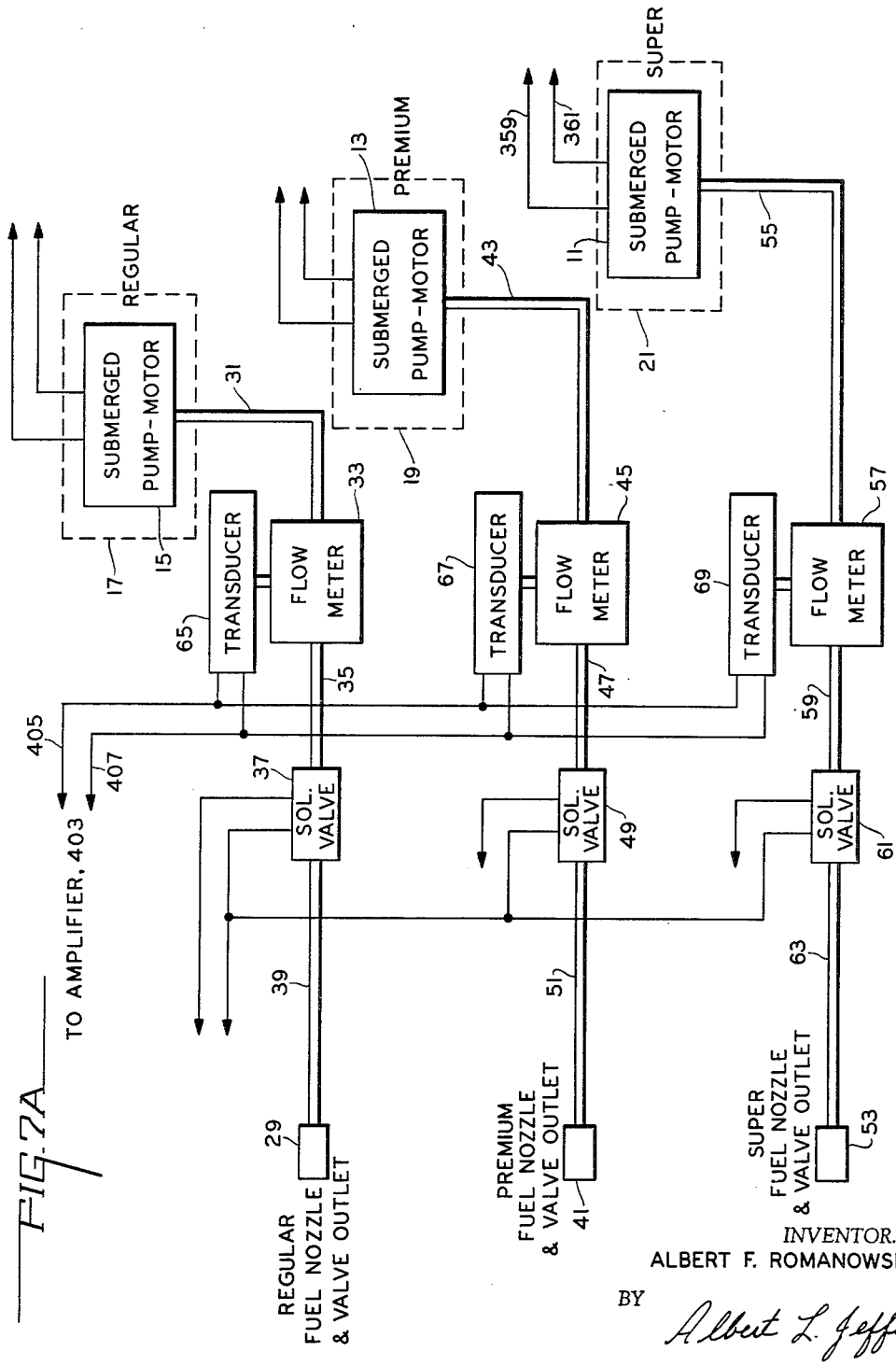

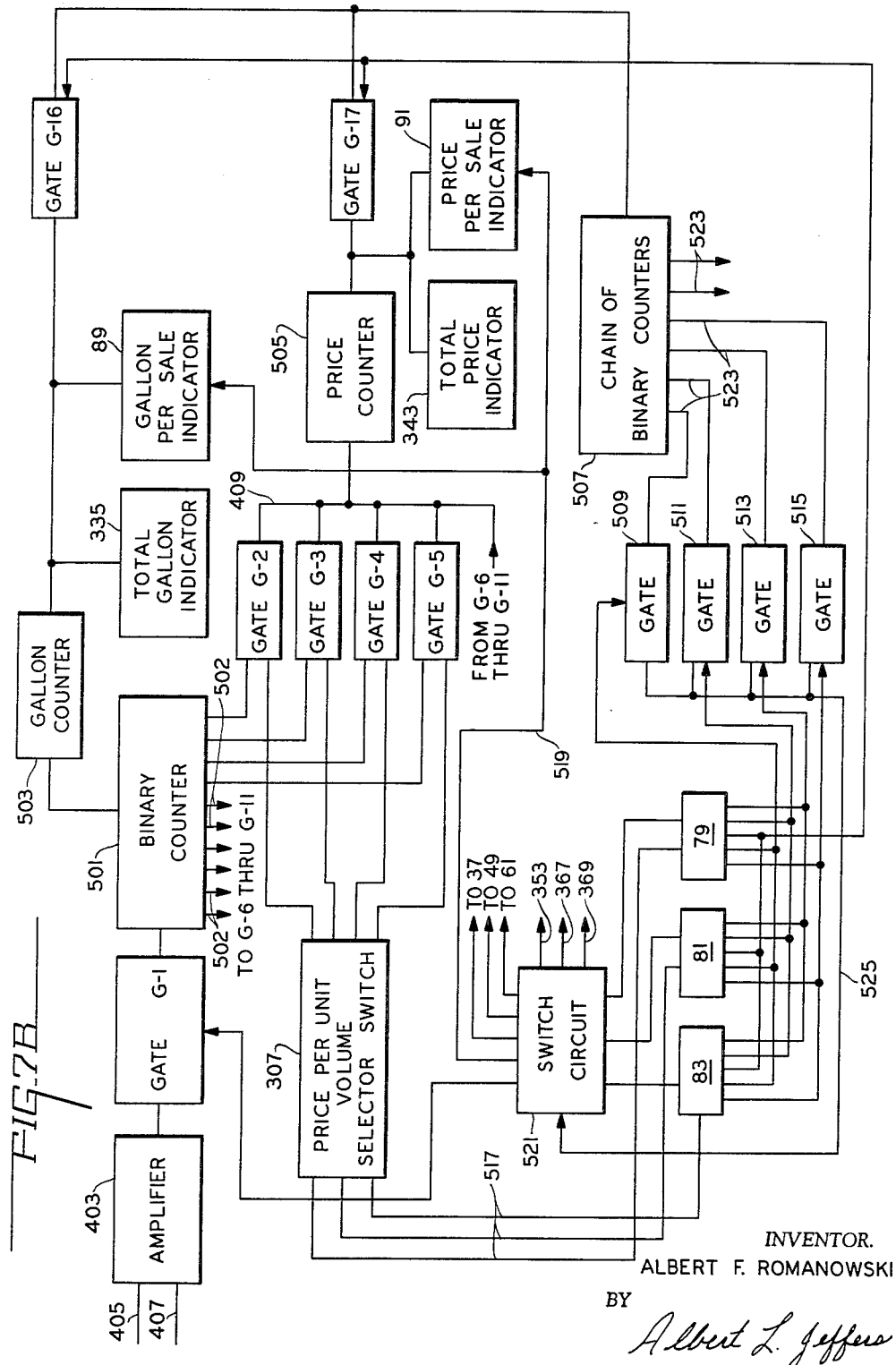

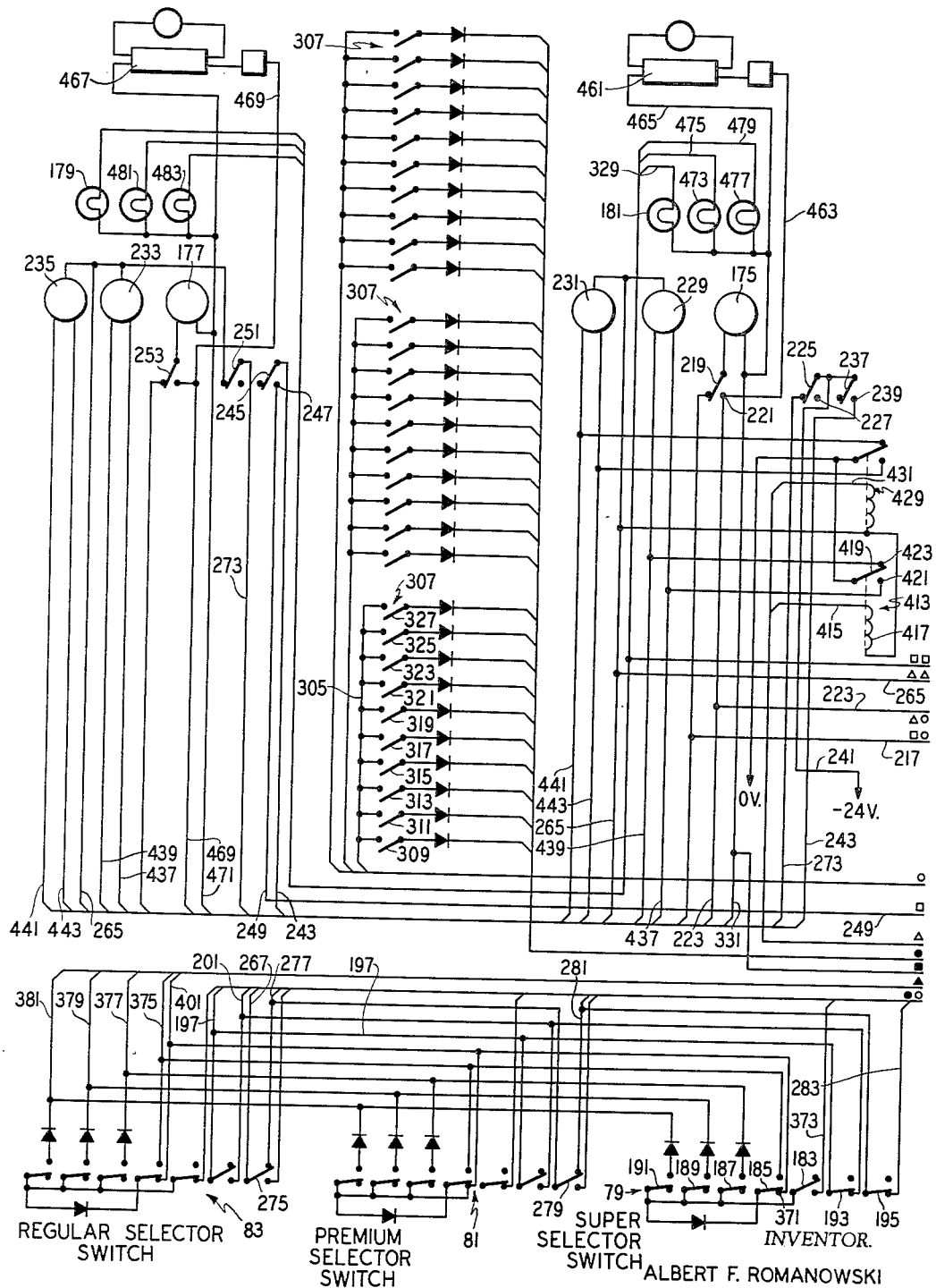

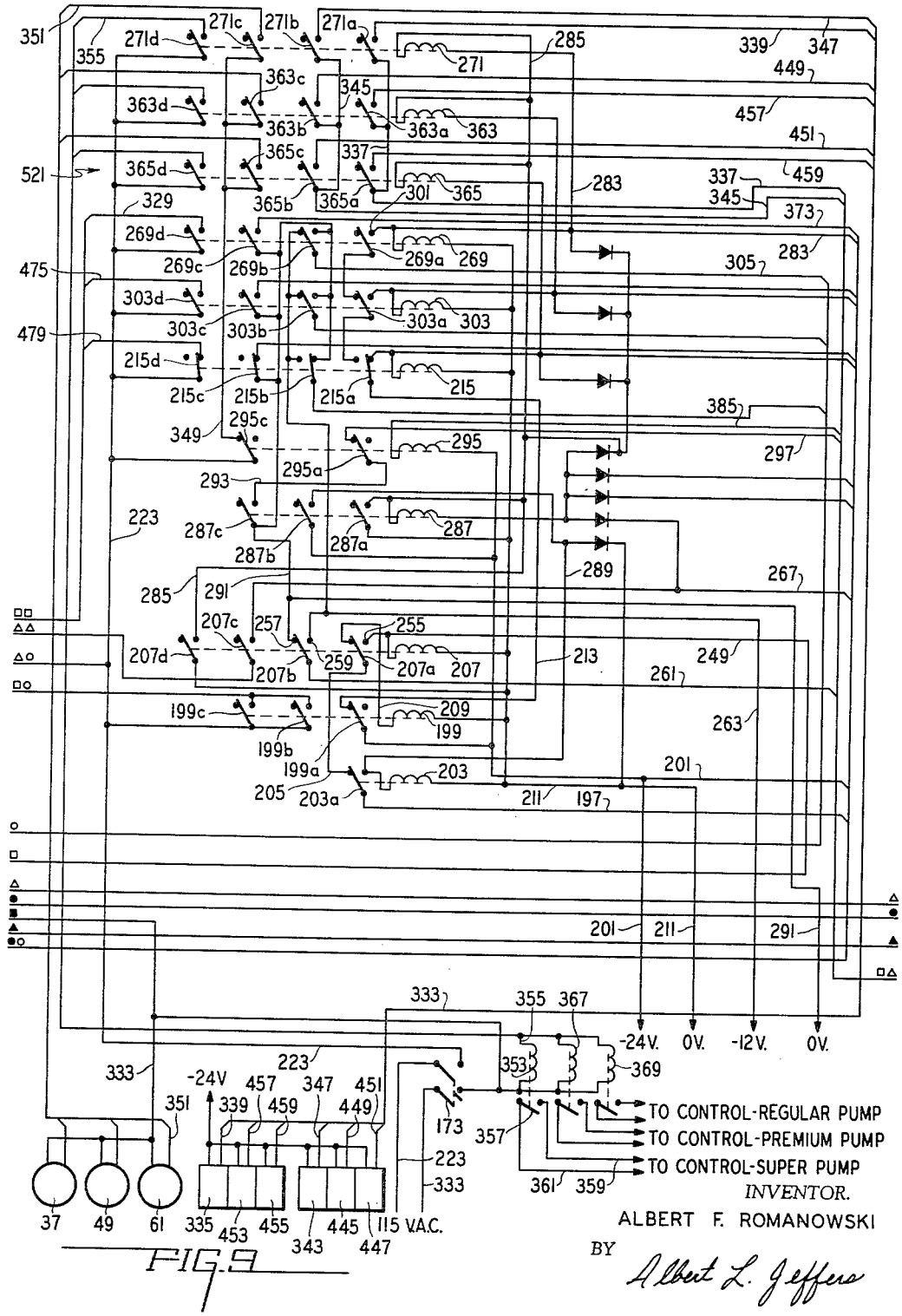

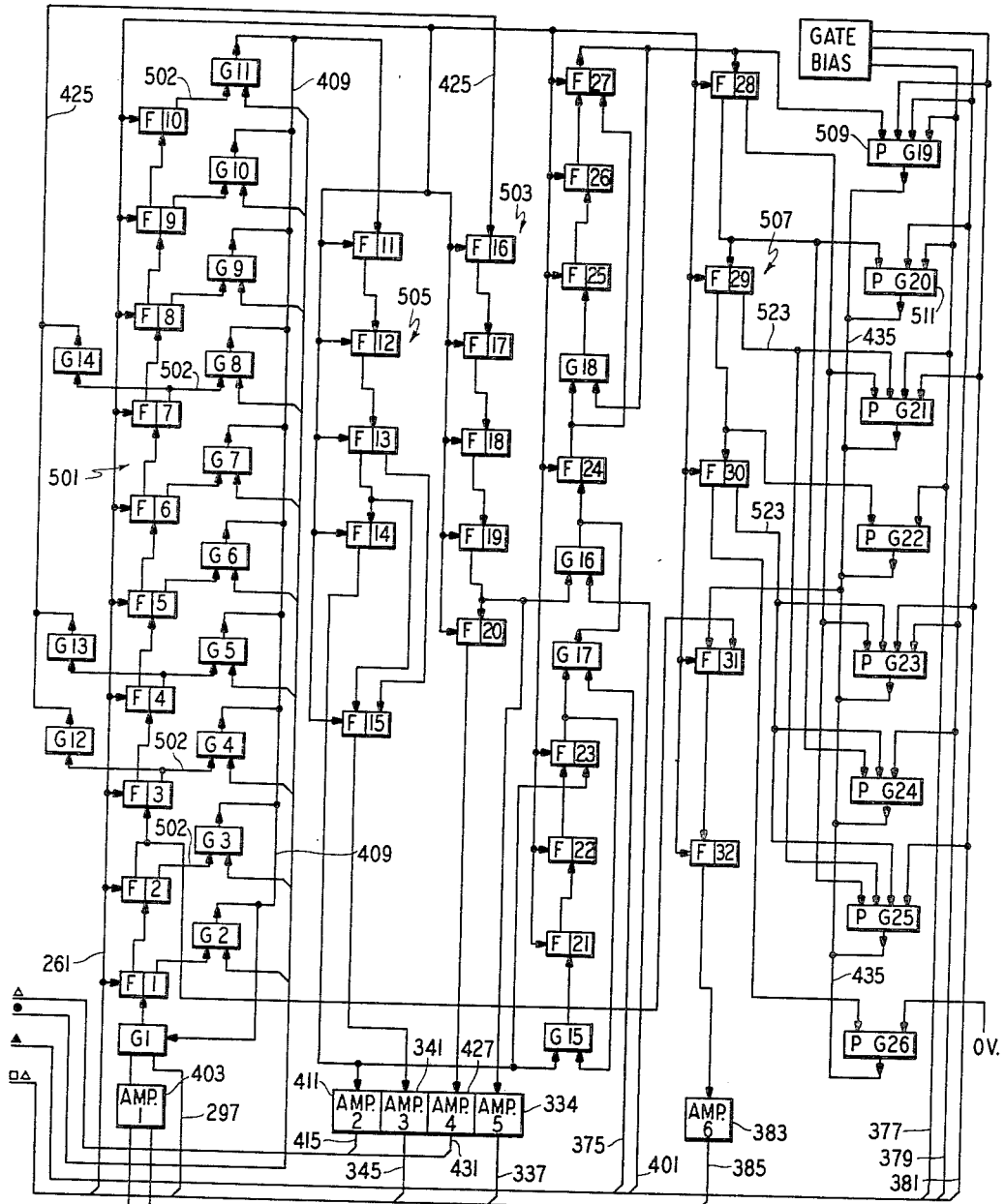
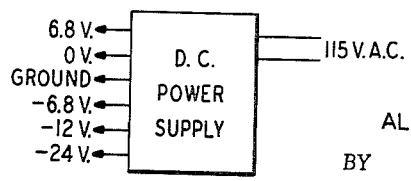

United States Patent Office 3,199,727
Patented Aug. 10, 1965

3,199,727
FUEL DISPENSING SYSTEM
Albert F. Romanowski, Fort Wayne, Ind., assignor to Bowser, Inc., Fort Wayne, Ind., a corporation of Indiana
Filed Dec. 12, 1961, Ser. No. 158,670
20 Claims. (Cl. 222—20)

This invention relates to a dispensing system for distribution of fuels, and more particularly it relates to a dispensing system which has a single computer-indicator that can be used on several grades of fuel such as regular, super and premium.

It is an object of the invention to provide a number of dispensing outlets having a single computer-indicator and in which each outlet is separately controlled by a selector switch.

A general object of the invention is to provide a fuel dispensing system in which the computer and indicator can be remotely located with respect to the service island so that the design architect of a service station has complete freedom in service station and traffic pattern planning.

Another object of the invention is to provide a computer-indicator which can be remotely located from the pump and meter and which will be drastically different in appearance, vastly more efficient in its use of land space and sales presentation of gallons received, grade price, and sales total, all of which are displayed in large bold numerals that can be easily read at a substantial distance.

A further object of the invention is to provide a dispensing system having a computer-indicator which can be positioned so that it can be read by the driver of an automobile receiving the fuel without the driver being required to look backwards.

A salient object of the invention is the provision of a selector control switch adapted to be set for predetermined transactions by the service station operator. The selector control switch may be set to deliver a predetermined gallonage, or, a predetermined number of dollars worth of fuel without the operator's attention and time being required after setting the predetermined amount on the selector control switch.

A further object of the invention is to provide a computer-indicator adapted to be used with two or more fueling outlets wherein the price per gallon for each grade of fuel is varied and including price means which can be easily changed with the increase or decrease of the price of the fuel.

A still further object of this invention is to provide a computer-indicator controlled by a selector switch which will, when actuated, turn on the remote pumping unit for the grade of fuel selected, automatically reset the dials to zero, indicate the price of the fuel, connect the computer in circuit to compute and indicate the quantity of fuel delivered and the price of the sale.

Yet a further object of the invention is to provide a number of fueling outlets, each controlled by selector switches and provided with electrical interlocks to prevent the delivery of fuel in the other outlets when one outlet is in operation.

Still another object of the invention is to provide a fueling sysem having a meter which will convert fuel flow into a predetermined train of pulses wherein the pulses are transmitted to the computer where they are shaped, amplified, and in turn fed into a binary counting chain. For gallonage readout, appropriate counting chains in the computer are collected and fed into another dividing network so that the output is in terms of a predetermined number of pulses per gallon, whereby the pulse is amplified and is used to drive a stepping motor which actuates the indicating mechanism. The readout for monetary operation is similar except various counting chains in the computer are selected by a price setting unit and the result displayed in terms of one cent (1¢) per pulse, at a rate dependent on the price setting and fuel flow through the meter.

A further object of the invention is the provision of a selector switch adapted to support a nozzle valve in a storage position and so designed that the nozzle can not be replaced in the storage position without positioning the selector switch in the original position.

Another object of the invention is the provision of an individual selector control switch for multiple grades of fuel being dispensed, and each selector switch is centrally located so that a selection of the grade of fuel can be dispensed without moving or positioning the automobile.

Yet another object of the invention is to provide a fueling system utilizing digital features and other associated components which will permit deliveries of fuel to be made with extreme accuracy. In actual test accuracies of ±one (1) cubic inch in five (5) gallons have been obtained.

Other objects of the invention will be pointed out in the following description and claims, and illustrated in the accompanying drawings which disclose by way of example the principle of the invention and the best mode which has been contemplated of applying that principle.

In the drawings:

FIGURE 7A is a diagrammatic view of the fueling system;

FIGURE 7B represents in schematic block form the arrangement and cooperation of the electrical units of the fueling system;

FIGURE 8 is a schematic circuit diagram of the master indicator, repeater indicator and selector control switches for three separate brands of fuel;

FIGURE 9 is a schematic circuit diagram of the relay panel, solenoid valves, totalizers and remote pumping starter controls;

FIGURE 10 is a schematic circuit diagram of the computer including the preselector section, power supply, and transducers for three brands of fuel.

Figure 1:
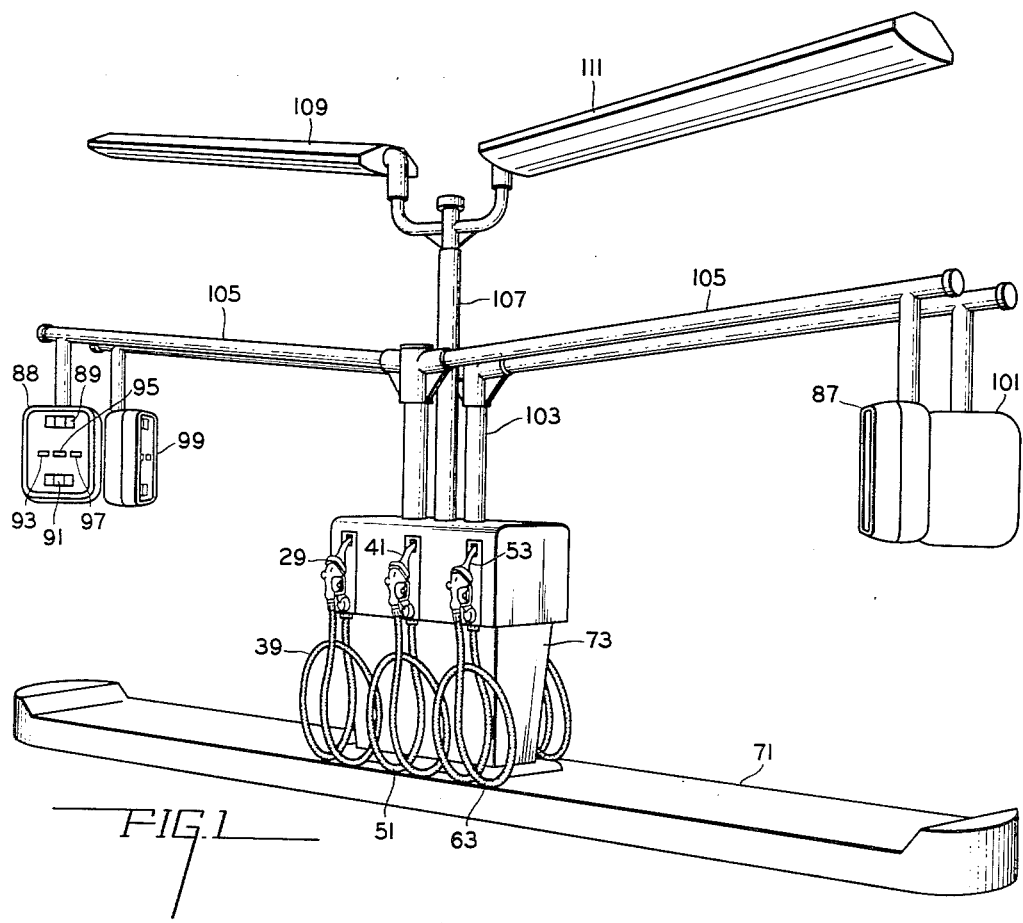
FIGURE 1 is a perspective view of a typical fueling installation illustrating the remote positioning of the computer-indicator.

Referring first to the diagrammatic view of the system illustrated in FIGURE 7A in which is indicated a number of filling station conventional submerged pumps 11, 13 and 15 driven by electric motors. The submerged pumps are disposed in underground storage tanks 17, 19 and 21. The underground tank 17 may contain a regular grade of fuel; the tank 19 may contain a premium grade of fuel; and the tank 21 may contain a super grade of fuel.

The submerged pump 15 is connected to the regular grade brand of fuel nozzle and valve outlet 29 through conduit 31, flow meter 33, which will generate electrical impulses directly proportional to the flow rate of fuel therethrough conduit 35, an electrical valve 37, such as a conventional solenoid valve, and hose 39.

The submerged pump 13 is connected to the premium grade brand of fuel nozzle and valve outlet 53, through conduit 43, flow meter 45 having the same construction as flow meter 33, conduit 47, valve 49 and hose 51.

The submerged pump 11 is connected to the super grade brand fuel nozzle and valve outlet 53, through conduit 55, flow meter 57 having the same construction as flow meter 33, conduit 59, valve 61 and hose 63.

The construction of the transducer 65, 67 and 69 is disclosed in my co-pending application, Serial No. 92,791. The circuits shown in FIGURE 7B will be fully described below.

Figure 2:
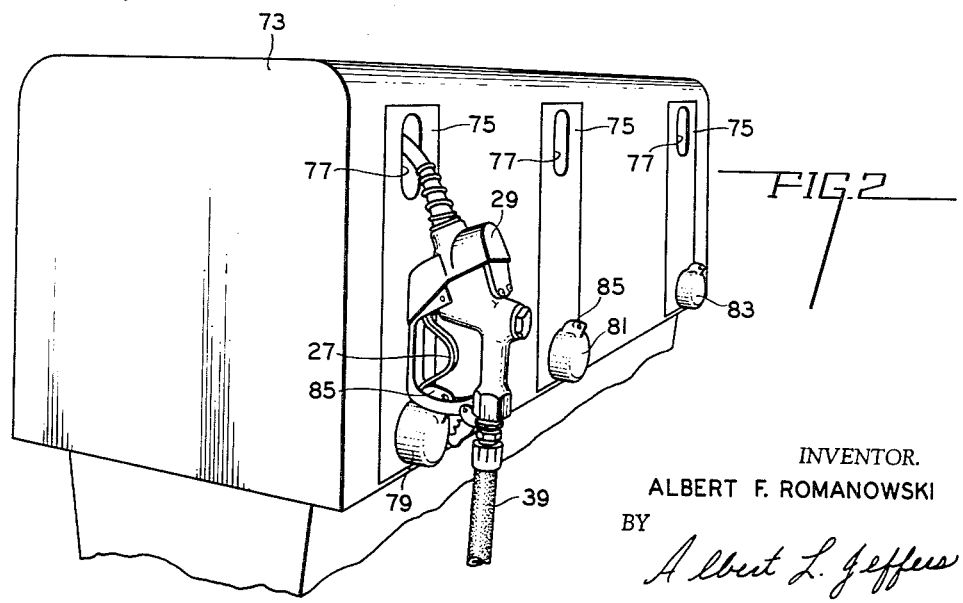
FIGURE 2 is a perspective view illustrating the selector switch supporting a nozzle valve in the storage position.
Figure 3:
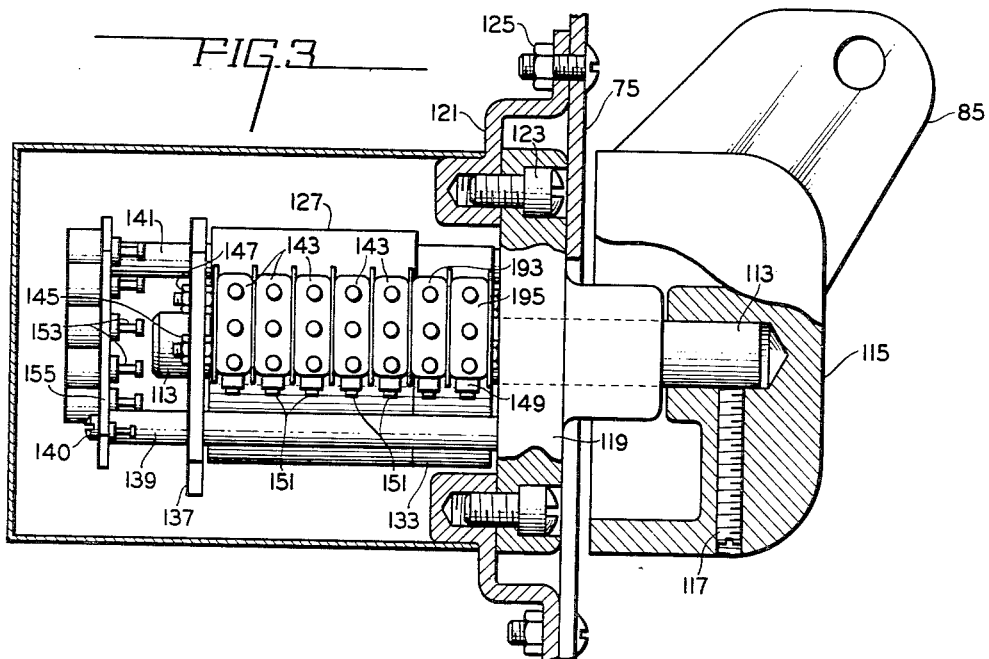
FIGURE 3 is a cross-sectional view illustrating the selector control switch.
Figure 4:
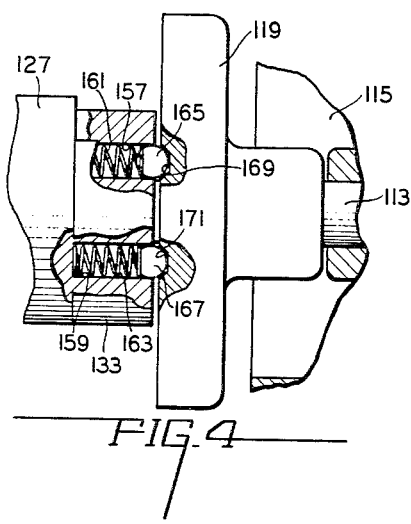
FIGURE 4 is a detailed view illustrating the spring loaded ball type detents which are associated with the selector control switch.

Referring now to FIGURES 1 and 2, the reference numeral 71 indicates an island for supporting a housing 73. A number of scuff plates 75 having an elongated opening 77 for receiving the tip of the dispensing nozzle involved, are mounted in the upper portion of the housing 73. Selector control switches 79, 81 and 83 are disposed directly beneath the elongated openings 77 and are provided with a projection 85 adapted to support each of the dispensing nozzles. It should be noted that the selector control switches must be positioned so that the projections are straight up and down in order to support the nozzle on the housing. When the projection is straight up and down the selector control switch is in a normally "off" position. If the selector control switch is in any other position than in the normally "off" position the nozzle can not be supported by the housing. The construction of the projection 85 is such that when the nozzle 29 is placed in the storage position it will actuate the lever 27 to close the nozzle valve.

The reference numeral 87 designates the master computer-indicator, and 88 the repeater indicator provided with a gallon totalizer 89 and total price indicator 91. The reference numeral 93 designates the price per gallon of the regular brand fuel, and the reference numeral 95 designates the price per gallon of the premium brand fuel, and the reference numeral 97 designates the price per gallon of the super brand fuel. The master indicator 99 is disposed on the other side of the island and is provided with a repeater indicator 101. The selector control switches and hoses are disposed on the opposite side of the housing 73. The supports 103 having arms 105 carry the electrical conduits to the computer-indicators, repeaters and, also, serve to position the computer-indicators and repeaters so that they are always in front of the automobile being serviced. Thus it is obvious that the driver of the automobile can view the computer-indicator without looking backwards as is required by conventional gasoline dispensers. The post 107 supports conventional lighting fixtures 109 and 111.

Referring to FIGURES 3–6 which illustrate the details of the selector control switch, the reference numeral 113 designates a shaft having a control knob 115 secured thereon by a set screw 117. The casting 119 is connected to a support 121 by screws 123. The support 121 is connected to the scuff plate by a bolt and nut 125.

A code drum 127 is mounted on the other end of the shaft 113 and is secured thereon by a pin (not shown) which is disposed in the groove 129. The code drum 127 is provided with a predetermined code in the form of spaced holes or depressions 131. The cam segment 133 is disposed on one end 135 of the drum and functions to actuate additional switches in sequential order. A mounting plate 137 is spaced from the casting 119 by spacers 139 and 141 having a stud 140. A number of micro switches 143 are mounted between the casing 119 and mounting plate 137 by a pair of studs 145 and 147. The micro switches are provided with arms 149 having rollers 151 adapted to be actuated by the predetermined code on the code drum. Lead lines (not shown) connect the micro switches to the terminal posts 153, mounted on the terminal plate 155.

Figure 6:
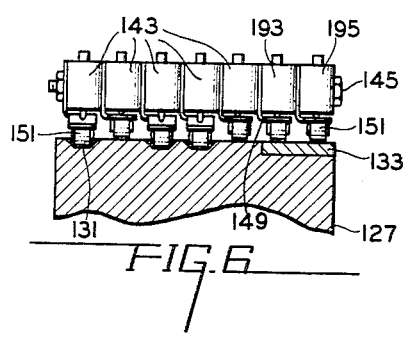
FIGURE 6 is a detailed view showing the micro switches positioned in a three dollar ($3.00) preset position on the code drum of the selector control switch.

As illustrated in FIGURE 6, the micro switches 143 having their rollers 151 disposed in the code holes 131 are closed. The micro switches having the rollers 151 disposed on the periphery of the code drum are open. The two micro switches 195 and 193 are operated by the cam 133 to the closed position.

The code drum 127 is provided with a pair of bores 157 and 159 for receiving a pair of springs 161 and 163 which exert pressure against detent spheres or detent balls 165 and 167 to project them into spaced openings 169 and 171 in the casting 119. The detent serves as a positive locating means for the selector control switch.

Referring now to FIGURES 8, 9 and 10, an explanation of the operation of the circuits for the fueling system is disclosed in detail. Let us assume that the switch 173 in the 115 volt power line has been closed and that all three selector switches 83, 81 and 79 are in the off position with the previous operation of the fueling system operated for the dispensing of regular brand gasoline. Now let us assume that the selector switch 79 is turned to manual operation for the dispensing of super brand gasoline. By actuating of the selector switch 79 a chain reaction takes place, the reset motors 175 and 177 are energized to reset the indicator to zero. When the submerged pump and motor 11 is started, the solenoid valve 61 is opened, the computer counting chains are reset to zero and the selected brand and price is indicated by a lighting system 179 and 181. Bearing in mind that all the above events take place in the matter of a second or two, the numreous circuits energized in this period of time will now be explained.

Figure 5:
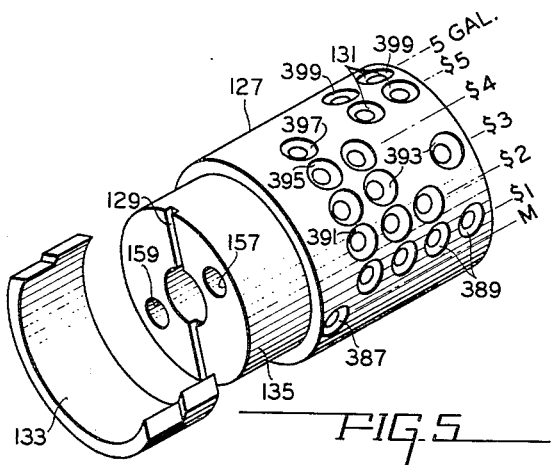
FIGURE 5 is a perspective view of the code drum associated with the selector control switch.

When the selector switch is set in the manual operating position the predetermined code on the code drum 127, FIGURE 5, will actuate the switch 183 to the open position to disconnect the zero volt circuit to micro switches 185, 187, 189 and 191. The switches 185 to 191 are not affected by the predetermined code on the code drum 127 for the manual operation. Micro switches 193 and 195 are closed by the cam segment 133 on the code drum 127. Upon the closing of switch 193 an operating voltage is established through line 197 to energize the reset relay 199 which actuates relay contacts 199a, 199b and 199c. The power is supplied to relay 199 from line 201, switch 193, line 197, relay contact 203a, line 205, relay contact 207a, and line 209 to relay 199. The relay 199 is connected directly to zero voltage by line 211. Upon the energization of relay 199 the operating voltage from line 213 is interrupted by the opening of relay contact 199a thereby releasing the power to relay 215.

The relay contacts 199c and 199b connect an operating voltage of 115 volts to line 217, which energizes the reset motors 175 and 177 for resetting the indicators to zero. As the reset motor 175 starts to rotate it actuates a cam (not shown) which moves the switch 219 to contact 221 to transfer the reset motor power source from line 217 to line 223 so that the power is obtained directtly from the 115 volt power source rather than through the relay contacts 199c and 199b. The reset motors 175 and 177 are connected in series and reset motor 177 is provided with cams (not shown) to operate switches 245, 251 and 253 in substantially the same sequence as reset motor 175 operates switches 219, 225 and 237. As the reset motor 175 continues to rotate another cam (not shown) actuates switch 225 to contact 227 to remove the operating voltage from the stepping motors 229, 231, 233 and 235. By removing the operating voltage from the stepping motors the load is reduced thereon so that the reset motors can set the indicators to zero. The reset motor 175 will actuate a third cam (not shown) to move the switch 237 to contact 239 to connect the operating voltage to relay 207. The operating voltage of minus 24 volts is applied to relay 207 through line 241, switch 237, contact 239, line 243, switch 245, contact 247, and line 249. The other side of the relay is connected directly to zero voltage by 211.

It should be noted that the reset relay 207 will not be actuated until both switch 237 and switch 245 are closed. This feature is necessary to insure proper reset action on both the master indicator and repeater. When the reset relay 207 is energized the operating voltage is disconnected from relay 199 by the transfer of relay contact 207a to contact 255 whereby a second voltage source to the coil of relay 207 is accomplished. The contact 207b moves from contact 257 to contact 259 thereby connecting reset voltage to all the bistable circuits F and the computer through line 261. The contact 259 is directly connected to a minus 12 power supply through line 263.

Upon the closing of relay contact 207c a circuit 265 is connected to circuit 267 to allow an operating voltage to be applied to switch 195 as the mechanical reset of the indicators is completed. A minus 24 volts is applied to the relays 269 and 271 through line 241, switch 225, line 273, switch 251, line 265, relay contact 207c, line 267, switch 275, line 277, switch 279, line 281, switch 195 and line 283. The relay contact 207d connects the zero voltage line 211 to line 285 to permit relay 287 and relay 271 to be energized after the mechanical resetting of the indicator has been completed. When the reset cycle is nearly completed the switch 219 is opened and the reset motors 175 and 177 are de-energized. This is accomplished due to the fact that relay 199 has been de-energized and there is no power present in line 217. Shortly after switch 219 is transferred, switch 225 closes thereby applying operating voltage to line 265, thereby energizing relays 287, 269 and 271. It should be noted that the operating voltage will not be applied to the line 265 until the switch 251 has been closed by the reset motor 177.

When relay 287 is energized the relay contact 287a connects a holding circuit for relays 287 and 271. Relay 287 being energized contact 287b establishes an operating voltage to the relay 203, through line 289. The closing of relay contact 287c connects the zero voltage line 291 to the delivery gate G1 through line 293, relay contact 295a and line 297. By applying the zero voltage to the delivery gate G1 the inhibiting bias from the gate is removed and the gate will open to permit flow signal to enter the computer.

When the relay 203 is energized, contact 203a transfers to contact 299 releasing the holding circuit to the resetting relay 207 and connects a holding circuit for relay 203. The holding circuit to relay 203 is made through the line 201, switch 193, line 197 and relay contact 203a. The other side of relay 203 is connected directly to the zero voltage by 211. By releasing the operating voltage to relay 199 the recycling thereof is prevented when the reset relay 207 is released. It should be noted that when relay 199 is energized, relay 215 is de-energized, and that when the reset relay 207 is energized, relay 199 is deenergized, and that when relay 203 is energized, the reset relay 207 is de-energized.

When the relay 269 is energized the relay contact 269a transfers to contact 301 connecting a holding circuit for relays 269 and 271. This holding circuit is established through the power line 201, relay contact 199a, line 213, relay contact 215a, relay contact 303a, relay contact 269a and line 283. Once the holding circuit is established for relay 215 it will be held until another dispensing operation is set on the selector switches. The primary reason for this is so that the indicator will continue to show the gallons and price of the last sale. The relay contact 269b connects the zero voltage by 291 to line 305 which is connected to the supply line price control switch mechanism 307. The price control mechanism is an electromechanical mechanism. The price control switches are preset to predetermined price per gallon of gasoline dispensed. The switches 309–327 inclusive, correspond to and are connected with gates G2–G11 inclusive in the computer. Relay contact 269c connects the zero voltage 291 to switch 183 which permits the switches 185, 187 and 189 to be effective except on the manual operation.

Relay contact 269d connects the operating voltage 223 to line 329 which is connected to the super brand indicator light 181. The other side of the light is connected directly to opposite side of A.C. power by line 331.

When the relay 271 is energized the relay contacts 271a, 271b, 271c and 271d are closed. When the relay contact 271a is closed a circuit is established from the amplifier 334, in the computer, to the super gallon totalizer 335, through line 337, relay contact 271a and line 339. When relay contact 271d is closed the amplifier 341 is connected to the price totalizer 343 through line 345, relay contact 271b and line 347. When relay contact 271c is closed power is applied to the solenoid valve 61 from the power source 223, relay contact 295c, line 349, relay contact 271c and line 351.

The submerged pump motor starter control relay 353 is energized through line 223, relay contact 271d, and line 355. The relay 353 when energized will close the switch 357 thereby actuating the submerged pump and motor 11 through lines 359 and 361. At this point the fueling system is conditioned for the delivery of fuel. The service station operator can manually operate the nozzle valve 53 to dispense the amount of fuel requested by the customer.

It should be noted that the reset relay 207 and relay 199 are de-energized, and relays 203 and 269 are energized thereby providing an electrical interlock to prevent delivery of the regular or premium fuels due to the fact that power through the selector control switches 83 and 81 is interrupted. The selector switches 81 and 83 are ineffective until the selector switch 79 has been returned to its normal or zero position.

After the desired amount of fuel is delivered to the customer the preselector control switch 79 is returned to the normally off position. The switch 191 opens and de-energizes relay 287. Upon the de-energization of relay 287, the relay contact 287a opens and de-energizes relay 271 which removes the operating voltage from the solenoid valve 61 by opening the relay contact 271a. At the same time the relay contact 271d opens to de-energize the starter control relay 353, relay contact 271a opens to break the circuit to the gallon totalizer 335, and relay contact 271b opens to break the circuit to the price totalizer 343. The nozzle valve can not be returned to the storage position unless the selector control knob 79 is turned to the normally off position so that the projection 85 can support the nozzle valve (see FIGURE 2).

The relay 269 remains energized until the next operation of the fueling system so that an indication of price and brand of fuel previously delivered can be made visible to the service station operator and driver of automobile as well. The switch 193 opens and de-energizes relay 203 which releases the electrical interlock on relay 199 thereby conditioning the system for initiation of another delivery by any one of the selector control switches 79, 81 or 83.

The operation for the dispensing of premium or regular brand fuel is substantially similar to the operation of the delivery of fuel of the super brand described above. The control sequence is substantially the same with the exception that the premium selector switch 81, or the regular selector switch 83 is actuated thereby energizing relays 303, 363 and 367 for the premium brand delivery, and relays 215, 365 and 369 will be energized for the regular brand delivery. The relays 269, 271 and 353 will not be energized when the premium or regular brand of gasoline is dispensed.

*Computer operation price and gallon computation*

During delivery of the fuel the transducer 69 is driven by the flowmeter 57 which produces an alternating voltage. The frequency of this signal in terms of cycles per gallon is predetermined by the transducer components. In this application it is preferred to have 819.2 pulses per gallon.

The transducers 65, 67 and 69 are connected to an amplifier 403 through lines 405 and 407 which amplifies and shapes the signal received from the transducer. The amplifier 403 is connected to the delivery gate G1 and sends a signal to the binary scaler that includes flip flops F1, F2, F3, F4, F5, F6, F7, F8, F9 and F10. Each binary counter F1 through F10 sends a signal to associated price gates G2, G3, G4, G5, G6, G7, G8, G9, G10 and G11. The output of the price gates G2 through G11 are connected to the price collector line 409.

The frequency in terms of pulses per gallon that appear on the price collector line is determined by the price control switch 307 for the particular grade of fuel being delivered. The price collector line is connected to the binary scaler which includes flip flops F11, F12, F13, F14 and F15. The output from binary counter F14 is connected to amplifier 411 and gate G15 in the preselector section of the computer. A signal from the flip flop F14 is sent to a mercury wetted relay 413 through amplifier 411 and line 415 which actuates the stepping motor 229 to operate the price indicator 91. In this operation one pulse from amplifier 411 energizes the coil 417 in the relay 413 changing the switch 419 to contact 421 which changes the zero voltage line to the stepping motor 229 so that it is de-energized and energized. When flip flop F14 is non-conducting the amplifier 411 is also non-conducting, therefore, coil 417 is released and the switch 419 is returned to contact 423, whereby the stepping motor is actuated one step. Thus one pulse is received from the amplifier 411 for each one cent (1¢) of gasoline dispensed which will energize the mercury wetted relay 413 to step the price indicator 229 one step to indicate one cent (1¢) on the price indicator 91.

The binary counter F15 is connected to amplifier 341. The gallon gates G12, G13 and G14 are connected to the associated binary counters F3, F4 and F7 and send a signal to the gallon collector line 425. The frequency of the signal that appears on the gallon collector line 425 is determined by the binary counters that are associated with the gallon gates. The gallon collector line feeds to the binary scaler which includes flip flops F16, F17, F18, F19 and F20. The output of F20 feeds to amplifier 427 which actuates a mercury wetted relay 429 through line 431. The mercury wetted relay 429 operates substantially as relay 413 to actuate the gallon stepping motor 231. The output of flip flop F19 is connected to amplifier 334 and to gate G16 in the preselector section of the computer.

*Preset operation*

Let us assume that the previous delivery of fuel from the fueling system was regular brand and it is now desired to preset the premium control switch 79 for a predetermined delivery of one dollar's ($1.00) worth of fuel. The selector switch 79, micro switches 195, 193 and 183 are closed. The micro switches 187, 189 and 191 are moved to the closed position. The micro switch 185 is moved to contact 371. Upon the closing of switches 193 and 195 the delivery control sequence and the resetting of the indicator is substantially the same as for the manual operation described above.

The closing of switch 183 connects zero voltage line 373 to the micro switches 185, 187, 189 and 191. The line 373 is connected to the zero voltage line 291 through relay contact 269c.

For the one dollar ($1.00) preset operation, the switch 185 is on contact 371 thereby connecting the zero voltage line 373 to line 375, which is connected to the gate G17 in the preselector section of the computer, thereby conditioning the computer to control price presets by opening the gate G17. The gate G17 is opened by applying zero voltage through line 375.

The closing of switches 187, 189 and 191 completes the zero voltage circuit from line 373 to lines 377, 379 and 381 thereby conditioning the gating in the preselector section of the computer to initiate fuel flow shut off when the quantity of fuel equivalent to one dollar ($1.00) has been delivered.

When the one dollar ($1.00) quantity of fuel has been delivered the amplifier 383 applies an operating voltage to energize relay 295 through line 385 to open relay contacts 295a and 295c. The opening of relay contact 295a disconnects the line 293 which supplies the zero voltage to the computer input through line 297. The interruption of this circuit locks the flow signal at the computer input thus stopping the operation of the computer. The opening of relay contact 295c disconnects the circuit 223 which de-energizes the solenoid valve 61 thus stopping the flow through the hose 63.

After the delivery of the one dollars ($1.00) worth of fuel the selector control switch 79 is returned to its normally off position which conditions the circuits the same as for the manual operation previously described.

When the selector control switch 79 is positioned to different preset values the control sequence is the same as previously described except that conditioning of the computer gating is varied in accordance with the variations selected. Referring to FIGURE 5, the predetermined code on the code drum is as follows: the cam segment 133 operates switches 195 and 193 and the code hole 387 conditions the fueling system for manual operation. The four code holes 389 condition the fueling system for a one dollar ($1.00) preset operation. The three code holes 391 conditions the fueling system for a two dollar ($2.00) preset operation. The three code holes 393 conditions the fueling system for a three dollar ($3.00) preset operation. The code holes 395 conditions the fueling system for a four dollar (4.00) preset operation. The code holes 397 conditions the fueling system for a five dollar ($5.00) preset operation. The code holes 399 condition the fueling system for a five (5) gallon preset operation.

When a two dollar ($2.00) amount is preset by the selector switch 79, the switch 183 connects the zero operating voltage 373 to line 375. The switch 187 connects the zero operating voltage from line 373 to line 377. The switch 189 connects the zero operating voltage from line 373 to line 379. The switch 191 is open thereby disconnecting the zero operating voltage from line 373 to the line 381.

When it is desired to preset a three dollar ($3.00) quantity on the selector switch 79, the switch 185 connects the zero operating voltage from line 373 to line 375; switch 187 connects the zero operating voltage from line 373 to line 377. The switch 189 is open thereby disconnecting the circuit to line 379. The switch 191 connects the zero operating voltage from line 373 to line 381.

When it is desired to preselect a four dollar ($4.00) amount on the selector switch 79, the switch 185 connects the zero operating voltage from line 373 to line 375. The switch 187 connects the zero operating voltage from line 373 to line 377. The switch 189 is open thus breaking the circuit to line 379. The switch 191 is open thus breaking the circuit from line 373 to line 381.

When it is desired to preselect for a quantity of five dollars ($5.00) on the selector switch 79, the switch 185 connects the zero operating voltage from line 373 to line 375. The switch 187 is open thereby disconnecting the circuit from line 373 to line 377. The switch 189 connects the zero operating voltage from line 373 to line 379. The switch 191 connects the zero operating voltage from line 373 to line 381.

When it is desired to set the selector switch 79 to a predetermined delivery of five (5) gallons then switch 185 connects the zero operating voltage from line 373 to line 401. The switch 187 is open thus disconnecting the zero operating voltage from line 373 to line 377. The switch 189 connects the zero operating voltage from line 373 to line 379 and the switch 191 connects the zero operating voltage from line 373 to line 381.

The predetermined delivery for the premium fuel and regular fuel selector switches 81 and 83 operate substantially the same as the selector switch 79 described above.

The signal received by the gate G15 has a frequency of 50 pulses per dollar value. The scaler that includes gate G15 and F21 through F23 reduces the frequency by a factor of 5, therefore, the frequency of the output 433 of F23, and the input to the price selector gate G17 is 10 pulses per gallon. When any dollar quantity is preset on the selector switch the price selector gate G17 is opened and the gallon selector gate G16 is closed. The scaler that includes F24 through F27 and gate G18 reduces the frequency of the output of the gate G17 by a factor of 10, therefore, the output frequency of F27 is one pulse per dollar value.

The preset gates G19 through G26 have several inputs. The input labeled P in the gates receives a pulse, and all other inputs receive a bias voltage supplied by one or both of the binary counters F29 and F30, or the gate bias network. The circuitry of the preset gates is so arranged that the input pulse will be blocked unless the bias is removed from the other inputs. The gate bias network supplies bias voltage to circuits 377, and 379 and 381 and all gate inputs connected to these circuits. The bias voltage will be removed from these circuits only when the corresponding preset switches connect them to the zero voltage circuit 291. The inputs biased by binary counters will not have their bias voltages removed until the binary counter is in the proper state.

Gate G19 is used when the preset number is 1. In the present illustration the gate G19 is used when the preset number is a one dollar ($1.00) value. However, this could be modified by changing the circuitry in the selector switches to operate for one gallon. The biased inputs to the gate G19 are connected to circuits 377, 379 and 381. For a preset of one dollar ($1.00) the selector switches function to connect the zero voltage circuit 291 to the three circuits and the first pulse from F27 will pass through gate G19 to the preset collector line 435 and initiate flow shut-off. The shut-off is accomplished by the first pulse from the preset collector line which changes the state of F31 and thereafter the first pulse from F2 will change the state of F31 to the original position; whereby when F31 changes back to its original position the state of F32 will be changed thereby sending a steady state signal to amplifier 6 to energize relay 295 which when energized breaks the circuit to one of the solenoid valves 61, 49 or 37. At the same time the circuit 297 is broken by the opening of relay contact 295a, closing the gate G1 to the computer.

Gate G20 is used for a preset of two and the inputs connect to the circuits 377 and 379. For a preset of two the selector control switches connect the zero voltage 291 to circuits 377 and 379 and the first pulse from F28 or two pulses from F27 will initiate the flow shut-off in the same manner as described for the preset number one.

For a preset of three, gate G21 is used and the selector switches will connect circuits 379 and 381 to the zero voltage 291, the third bias voltage to the gate G21 is supplied by F29. The bias state of F29 will be removed on the second pulse from F27 and the third pulse from F27 will pass to the preset collector line and initiate flow shut-off as previously described above.

The presets four and five are operated in a similar manner.

*Gallon Presets*

When it is desired to present a gallon quantity, the gallon selector gate G16 is opened and the price selector gate G17 is closed. This is accomplished by the gallon selections on the selector switches 79, 81 and 83. The frequency of the signal received by gate G16 is 10 pulses per gallon. The scaler that includes F24 through F27 reduces the frequency of gate G16 by a factor of 10; therefore, the output frequency of F27 is one pulse per gallon. The flow shut-off is initiated in the same manner as that described for the dollar valve shut-off.

*Master indicator operation*

The output of the computer-amplifier 411 is connected to a line 415 which operates the mercury wetted relay 413 for the price stepping motor 229. The frequency of the signal on circuit 415 is diametrical square wave pulses per dollar. The output of the price mercury wetted relay feeds to circuits 437 and 439 which are connected to independent coils (not shown), and the price stepping motor. Each voltage change on circuit 415 will cause the stepping motor to advance one step which makes the stepping frequency equal to 100 steps per dollar; therefore, each step will represent one cent (1¢). The price stepping motor 229 operates a mechanical counter 91 which is adapted to be reset by the reset motor 175.

The output of the amplifier 427 is connected to line 431 which operates the mercury wetted relay 429. The mercury wetted relay 429 is connected to circuits 441 and 443 which are connected to the two coils (not shown) in the gallon indicator stepping motor 231. The stepping motor 231 operates a mechanical counter or indicator 89 and advances the indicator at the rate of 10 times per gallon. If desired, the indicator and computer circuitry can be modified to register 100 times per gallon, to register hundredths of a gallon of fuel delivery.

The mechanical counters 89 and 91 in the repeater indicator are identical to the ones in the master indicator. The stepping motors 233 and 235 are connected in series with the stepping motors 229 and 231.

*Totalizer operation*

The output of the computer-amplifer 341 is connected to energize the price totalizers 343, 445 and 447 through line 345, relay contact 365b or 363b or 271b and the corresponding line 347, line 449 or line 451. The output of the computer-amplifier 334 is connected to energize the gallon totalizers 335, 453 or 455 through line 337, relay contact 365a, 363b, or 271a and the corresponding lines 339, 457 or 459. The gallon totalizers and price totalizers are used for inventory purposes for each price and gallonage of brand of fuel being delivered.

The conventional fluorescent light 461 for the master computer and indicator is connected to the 115 volt power supply 223 through line 463 and is connected to the ground 333 through line 465. The conventional fluorescent light 467 for lighting the repeater indicator is connected to the power supply 223 through line 469 and is connected to the ground 333 through line 471. The brand indicator light 473 for the premium brand is connected to be operated by the relay contact 303d through line 475. The brand indicator light 477 is connected to be operated by the relay contact 215d through line 479. The indicator light 481 is connected in series with the brand indicator light 473 and the brand indicator light 483 is connected in series with the brand indicator light 477.

General operation

Referring now to FIGURES 7A and 7B, remembering that fuel flows through only one of the delivery lines 39, 51 or 63 at any one time, the output pulses from only one transducer 65, 67 or 69 are applied through the leads 407 and 405 to an amplifier 403. The output of amplifier 403, being a series of pulses having a frequency proportional to the rate of flow through the meters 33, 45 and 57 which transmits the frequency through one of the transducers 65, 67 or 69, and is applied through a gate circuit G1 to a binary counter 501. As will hereinafter be explained, the binary counter 501 is of the "flip-flop" type comprising a series of flip-flop circuits connected in cascade with each flip-flop dividing the frequency of the pulses from the preceding flip-flop by a factor of two. Thus, one output pulse will be derived at the output of the first flip-flop for every two input pulses to the counter; one output pulse will be derived from the second flip-flop for every four input pulses applied to the counter; one output pulse will be derived from the third flip-flop for every eight input pulses applied to the counter; one output pulse will be derived from the fourth flip-flop for every sixteen input pulses applied to the counter, and so on. As shown, the counter 501 has a plurality of output leads or terminals 502, each of these leads being connected to the output of one of the flip-flops in the counter so that, starting from left to right as viewed in FIGURE 7B, the frequency of the output pulses on the leads 502 will gradually decrease for a given input pulse frequency. The output terminals 502 are each connected to a gate circuit, only four of such circuits being shown in FIGURE 7B and identified as G2, G3, G4 and G5. The gate circuits G2–G5 and the succeeding gate circuits G6–and G11 are controlled by a price per unit volume selector switch 307. The switch 307 is such that it will open a series of predetermined gate circuits G2–G11 while closing all of the other gate circuits. As shown, the outputs of the gate circuits G2–G11 are all connected to a price counter 505. Since the frequency of the input pulses applied to gate circuits G2–G11 increases for a given volume of fuel delivered through one of the delivery lines, it can be seen that the number of output pulses applied to the price counter 505 will be proportional to the monetary value of the fuel delivered. Furthermore, the monetary value of the fuel, represented by the number of output pulses applied to the counter 505, will be dependent upon which gate circuits G2–G11 are open and this is controlled by the price selector switch 307. If it is assumed, for example that the maximum price per gallon of fuel delivered to any one of the delivery lines is forty cents (40¢) per gallon, then the price selector switch 307 will be adjusted to open three predetermined gates while closing all other gates. Under these circumstances, the highest number of pulses for a given input pulse frequency to the binary counter 501 will be delivered to the price counter 505. If, on the other hand, the price per gallon of the fuel delivered is, say thirty nine cents (39¢) per gallon, then the switch 307 will open four predetermined gates while closing all other gates so that the frequency of the pulses applied to the price counter 505 is reduced for a given volume of fuel passing through one of the delivery lines 39, 51 or 63. It can thus be seen that depending upon which one of the gates G2–G11 is open, the number of pulses applied to price counter 505 will vary as a function of the price per gallon of the fuel delivered, the number of pulses on the collector line 409 for a given volume of fuel being largest when gates G2–G11 are open and the least when gate G11 is open and gates G2–G10 are closed.

It will be noted that the price per unit volume selector switch 307 is connected through leads 517 to regular, premium and super preselector switches 83, 81 and 79, respectively. As will hereinafter be seen, the switch 307 is controlled by the switches 83, 81 and 79. If the price of the regular is, for example, thirty cents (30¢) per gallon, switch 83 will automatically actuate switch 307 to open the proper gates in the series G2–G11. Similarly, if the premium grade is thirty three cents (33¢) per gallon, the premium selector switch 81 will actuate switch 307 to open the proper gate in the series G2–G11; and finally, if the super price per gallon is thirty six cents (36¢), the super selector switch 79 will actuate the switch 307 to likewise open the proper gates in the series G2–G11.

Since the output pulses from the gates G2–G11 have frequencies proportional to the monetary value of the fuel delivered through any one of the delivery lines, these pulses may be counted in price counter 505 which produces an output pulse each time the monetary value of fuel delivered equals one cent (1¢). The pulses are, in turn, applied to a total price indicator 343 as well as a price per sale indicator 91. The total price indicator simply comprises a device for displaying the total price of fuel delivered over a period of time, for example, one day. The price per sale indicator 91, however, indicates the price for each fuel sale only and is reset after each sale and before the next successive sale through lead 519 connected to a master switch circuit 521. As will be seen, the master switch circuit 521 is controlled by the preselector switches 83, 81 and 79, the arrangement being such that the price per sale indicator 91 will be reset by initially turning one of the preselector switches 83, 81 or 79; shown in detail in FIGURES 3–6, from a zero position to a selected total monetary value or total gallon position. That is, after each fuel delivery is completed, a control knob for the applicable preselector switch is turned to zero. Thereafter, in order to make a further fuel sale the preselector switch must be rotated from a zero position to a particular selection of manual, gallon or monetary position. At this time the price per sale indicator 91 is reset through lead 519, meaning that the price per sale will be indicated to the service station attendant and customer until the next delivery of fuel is to be made.

From the price counter 505 the output pulses indicative of the monetary value of the fuel delivered are passed through gate G17 to a chain of binary counters 507. The binary counters 507 are similar to the binary counter 501 and are provided with a plurality of output leads 523 on which pulses will appear for different numbers of input pulses applied to the binary counter 507. The leads 523 are connected to gates 509, 511, 513 and 515 as well as further gates, not shown in FIGURE 7B. The lead 523 connected to gate 509 will receive an input pulses from counter 507 for every one hundred (100) input pulses applied to the counter. Thus, an output pulse will appear on the lead 523 connected to gate 509 after an amount of fuel equal in value to one dollar ($1.00) has been delivered. Similarly, an output pulse will appear on the lead 523 connected to gate 511 after two hundred (200) input pulses are applied to counter 507, meaning that the pulse applied to gate 511 will represent a monetary value of fuel delivered equal to two dollars ($2.00). Similarly, gates 513 and 515 will receive pulses when monetary values of fuel equal to three dollars ($3.00) and four dollars ($4.00) respectively, are delivered. The remaining two input leads from counter 507 are connected to a gate representing a five dollar ($5.00) monetary value of fuel delivered and five (5) gallons of fuel delivered. The gates 509–515 are, in turn controlled by the preselector switches 83, 81 and 79. That is, if regular fuel is being delivered and the preselector switch 83 is rotated to the three dollar ($3.00) value, then gate 513 will be opened and will produce an output pulse on lead 525 after fuel having a value of three dollars ($3.00) has been delivered. Similarly, any one of the other preselector switches 81 or 79 will open one of the gates 509–515, depending upon the preselected value of fuel which is desired to be delivered. When a pulse is received on lead 525 from any one of the gates 509–515 it actuates the switch circuit 521 to close the appropriate solenoid valve 37, 49 or 59 (FIGURE 7A) and when the selector knob is turned to zero it will disable the appropriate pump motors through circuit 353.

Referring again to the binary counter 501, it is also connected to a gallon counter 503 which will produce an output pulse each time at a predetermined number of gallons are delivered through any one of the delivery lines, depending upon which one of the tranducers 65–69 is operating. The output pulses from counter 503, in turn, are applied to a total gallon indicator 335 and the gallon per sale indicator 89. Elements 335 and 89 serve the same function as elements 343 and 91, except that they indicate gallons rather than price. Furthermore, the gallon per sale indicator 89, like price per sale indicator 91, is reset through lead 519 each time any one of the preselector switches 83, 81 or 79 is advanced from its zero position.

The output pulses from counter 503 representing the gallons delivered are also applied through the gate G16 to binary counters 507 which will produce an output pulse on one of the leads 523 after five gallons of fuel are delivered. This pulse, in turn, may then be passed through a gate similar to gates 509–515 to actuate the switch circuit 521 to stop a cycle of operation. The gates G16 and G17 are controlled by the selector switches 83, 81 and 79, the arrangement being such that gate G17 will open when any switch 83, 81 or 79 is rotated to a dollar value position; whereas gate G16 will open only when any switch 83, 81 or 79 is rotated to a preselected gallon position. Gate G1 is controlled by switch circuit 521 and will open whenever any one of the preselector switches 83, 81 of 79 is rotated from its zero position.

For manual operation, one of the switches 83, 81 or 79 will be rotated to the "manual" position. Under these circumstances, none of the gates at the output of total price or gallon counter 507 will be open, nor will gates G16 and G17. However, the remainder of the circuit will operate to give the price and gallonage per sale on indicators 91 and 81 while the amount of fuel delivered is controlled by a conventional nozzle 29, 41 or 53 (FIGURE 1) at the exit end of the delivery line.

It is to be understood in connection with this invention that the embodiments shown are only exemplary, and that various modifications can be made in construction and arrangement within the scope of the invention as defined in the appended claims.

I claim:
1. An electrically controlled fuel dispensing system comprising, in combination:
    (a) a number of pumps communicating with separate storage tanks,
    (b) a separate meter connected to each pump,
    (c) a combination computer and indicator,
    (d) transducer means for transferring impulses directly proportional to the flow rate of fuel through the meter being actuated to said computer and indicator,
    (e) a repeater indicator spaced from the combination computer and indicator,
    (f) said repeater indicator adapted to be operated by said combination computer and indicator,
    (g) each meter provided with a discharge hose having a nozzle and valve at one end,
    (h) selector switch means for controlling the operation of each pump,
    (i) and interlock means for preventing the operation of the other pumps when one selector means has been actuated.
2. An electrically controlled fuel dispensing system comprising, in combination:
    (a) a number of pumps driven by electric motors communicating with separate storage tanks,
    (b) a separate meter connected to each pump,
    (c) a combination computer and indicator,
    (d) means for transferring impulses directly proportional to the flow rate of fuel through the meter being actuated to said computer and indicator,
    (e) each meter provided with a discharge hose having a nozzle and valve at one end,
    (f) an electrically operated valve disposed in each discharge hose between the meter and nozzle valve,
    (g) preselector control switch means adapted to energize each pump motor,
    (h) said preselector control switch means adapted to be set for predetermined transactions,
    (i) whereby when said preselector control switch means is set to a selected predetermined transaction the electrically operated valve will close upon completion of the predetermined transaction,
    (j) and interlock means for preventing the operation of the other pumps when one preselector control switch means has been actuated.
3. An electrically controlled fuel dispensing system comprising, in combination:
    (a) a number of pumps driven by electric motors communicating with separate storage tanks,
    (b) a separate meter connected to each pump,
    (c) a computer and indicator,
    (d) means for transferring impulses directly proportional to the flow rate of fuel through the meter being actuated to said computer and indicator,
    (e) each meter provided with a discharge hose having a nozzle and valve at one end,
    (f) an electrically operated valve disposed in each discharge hose between the meter and nozzle valve,
    (g) each pump motor adapted to be controlled by a preselector switch means,
    (h) said preselector switch means adapted to be presettable for selected transactions, whereby
    (i) when a selected transaction is preset on the preselector switch means it will permit operation of the fuel dispensing system until the selected transaction has been accomplished and thereafter prevent operation of said system,
    (j) and interlock means for preventing the operation of the other pumps when one preselector switch means has been actuated.
4. An electrically controlled fuel dispensing system comprising, in combination
    (a) a number of pumps communicating with separate storage tanks,
    (b) a separate meter connected to each pump,
    (c) a computer and indicator for computing and indicating the gallons of fuel passing through the system, grade price and sales total,
    (d) visual price setting means associated with said computer to control the sales total on said indicator,
    (e) transducer means for transferring impulses directly proportional to the flow rate of fuel through the meter being actuated to said computer,
    (f) each meter provided with a discharge hose having a nozzle and valve at one end,
    (g) selector switch means for controlling the operation of each pump,
    (h) and interlock means for preventing the operation of the other pumps when the selector switch means for one pump has been actuated.
5. For use with a fuel dispensing system having a fuel supply means and a fuel delivery line connected to the output of said supply means; the combination of:
    (a) transducer means for producing electrical pulses having a frequency proportional to the rate of flow of fluid through the delivery line,
    (b) a plurality of fuel counting devices each of which is adapted to produce an output pulse in response to a predetermined number of input pulses from said transducer means,
    (c) price counting means connected to the outputs of said fuel counting devices for producing an output signal indicative of the price of fuel delivered through said fuel delivery line, (d) and price per unit volume selector switch means for enabling one of said fuel counting devices to pass its output pulses to said price indicating counting means while disabling the other fuel counting devices from passing their output pulses to said price indicating counting means.

6. For use with a fuel dispensing system having a fuel supply means and a fuel delivery line connected to the output of said supply means; the combination of:

(a) transducer means for producing electrical pulses having a frequency proportional to the rate of flow of fluid through the delivery line, (b) first counting means responsive to input pulses from said transducer means and having a plurality of output terminals, (c) said first counting means being characterized in that output pulses will appear on the respective output terminals for different numbers of input pulses applied to the counting means, (d) a total price counter, a plurality of gate circuits each of which connects an associated one of said output terminals to said price counter, (e) and a price per unit volume selector switch adapted to open a selected one of said gate circuits while closing all other gate circuits.

7. For use with a fuel dispensing system having a fuel supply means and a fuel delivery line connected to the output of said supply means; the combination of:

(a) valve means in said fuel delivery line, (b) transducer means for producing electrical pulses having a frequency proportional to the rate of flow of fluid through the delivery line when said valve means is open, (c) a plurality of binary counting devices each of which is adapted to produce an output pulse in response to a predetermined number of input pulses from said transducer means, (d) price counting means connected to the outputs of said binary counting devices for producing an output pulse in response to a predetermined number of input pulses from any one of said binary counting devices, (e) price per unit volume selector switch means for enabling one of said binary counting devices to pass its output pulses to said price indicating counting means while disabling the other binary counting devices from passing their output pulses to said price indicating counting means, (f) a price totalizing counter connected to the output of said price counting means, (g) said price totalizing counter having a plurality of output terminals and characterized in that the output pulses will appear on the respective output terminals for different numbers of input pulses applied to the price totalizing counting means, (h) control means for said valve means in the fuel delivery line, (i) a plurality of gate circuits each of which is adapted to connect an associated one of said output terminals from the price totalizing counter to said control means, (j) and a total price selector switch adapted to open a selected one of said gate circuits while closing all other gate circuits, the arrangement being such that when the total price of a fuel delivered through said line reaches an amount determined by said total price selector switch a signal will pass through a selected one of said gate circuits to the control circuit to close said valve means and stop the flow of fuel through said fuel delivery line.

8. For use with a fuel dispensing system having a fuel supply means and a fuel delivery line connected to the output of said supply means; the combination of:

(a) valve means in said fuel delivery line, (b) transducer means for producing electrical pulses having a frequency proportional to the rate of flow of fluid through the delivery line when said valve means is open, (c) a plurality of binary counting devices each of which is adapted to produce an output pulse in response to a predetermined number of input pulses from said transducer means, (d) a normally closed gate device for applying said output pulses from the transducer means to said binary counting devices, (e) price counting means connected to the outputs of said binary counting devices for producing an output pulse in response to a predetermined number of input pulses from any one of said fuel counting devices, (f) price per unit volume selector switch means for enabling one of said fuel counting devices to pass its output pulses to said price indicating counting means while disabling the other binary counting devices from passing their output pulses to said price indicating counting means, (g) a price totalizing counter connected to the output of said price counting means, (h) said price totalizing counter having a plurality of output terminals and characterized in that the output pulses will appear on the respective output terminals for different numbers of input pulses applied to the price totalizing counting means, (i) control means for said valve means in the fuel delivery line, (j) a plurality of gate circuits each of which is adapted to connect an associated one of said output terminals from the price totalizing counter to said control means, (k) total price selector switch adapted to open a selected one of said gate circuits while closing all other gate circuits, the arrangement being such that when the total price of the fuel delivered through said line reaches an amount determined by said total price selector switch, a signal will pass through a selected one of said gate circuits to the control circuit to close said valve means and stop the flow of fuel through said fuel delivery line, (l) means controlled by said maximum total price selector switch for selectively opening said normally closed gate device at the output of said transducer means, (m) and means responsive to said signal passing through a selected one of said gate circuits for again closing said last mentioned gate device.

9. For use with a fuel dispensing system having a fuel supply means and a fuel delivery line connected to the outlet of said supply means; the combination of:

(a) valve means disposed in said fuel delivery line, (b) transducer means for producing electrical pulses having a frequency proportional to the rate of flow of fluid through the delivery line when said valve means is open, (c) a fuel volume counting device responsive to the pulses from said transducer means for producing an electrical output signal in response to a predetermined number of pulses from said transducer means, (d) and apparatus responsive to said electrical output signal for closing said valve means, the arrangement being such that the valve means will be closed after a predetermined volume of fuel has been delivered through said line.

10. For use with a fuel dispensing system having a fuel supply means and a fuel delivery line connected to the output of said supply means, the combination of:

(a) valve means in said fuel delivery line, (b) means for selectively opening said valve means to permit fluid to flow through said supply line, (c) transducer means for producing electrical pulses having a frequency proportional to the rate of flow of fluid through the delivery line when said valve means is open, (d) a binary counting device responsive to the pulses from said transducer means for producing an electrical output signal in response to a predetermined number of pulses from said transducer means, (e) and an apparatus responsive to said electrical output signal for closing said valve means.

11. For use with a fuel dispensing system having a fuel supply means and a fuel delivery line connected to the output of said supply means, the combination of:

(a) electrically operated valve means in said fuel delivery line, (b) transducer means for producing electrical pulses having a frequency proportional to the rate of flow of fluid through the delivery line when said valve means is open, (c) a counting device responsive to the pulses from said transducer means for producing an electrical output signal in response to a number of pulses from said transducer means corresponding to a predetermined volume of fuel delivered through said delivery line, (d) and an apparatus responsive to said electrical output signal for closing said valve means.

12. The combination of claim 11 and including:

(a) switch means connecting said electrical output signal to said apparatus for closing the valve means, (b) apparatus for selectively closing the switch means, (c) and apparatus for opening the switch means while simultaneously opening said valve device whereby the flow of fuel through said delivery line may be manually controlled.

13. For use with a fuel dispensing system having a fuel supply means and a fuel delivery line connected to the output of said supply means, the combination of:

(a) valve means in said fuel delivery line, (b) transducer means for producing electrical pulses having a frequency proportional to the rate of flow of fluid through the delivery line when said valve means is open, (c) a price per unit volume counting device responsive to the pulses from said transducer means for producing an electrical output signal in response to a number of pulses from said transducer means corresponding to a predetermined monetary value of fuel delivered through said delivery line, (d) and apparatus responsive to said electrical output signal for closing said valve means.

14. For use with a fuel dispensing system having a fuel supply means and a fuel delivery line connected to the output of said supply means; the combination of:

(a) transducer means for producing electrical pulses having a frequency proportional to the rate of flow of fluid through said delivery line, (b) a fuel volume counting device adapted to produce an output signal in response to a predetermined number of input pulses from said transducer means, (c) price counting means responsive to the output signal from said fuel counting device for producing a signal which varies as a function of the monetary value of fuel delivered through said delivery line, (d) and visual price indicating means responsive to said last mentioned signal for visually displaying said monetary value of fuel delivered through said delivery line.

15. The combination of claim 14 and including means for selectively resetting said price indicating means to zero after a quantity of fuel is delivered through the line and before the next successive quantity is delivered through the line.

16. For use with a fuel dispensing system having a fuel supply means and a fuel delivery line connected to the output of said supply means; the combination of:

(a) transducer means for producing electrical pulses having a frequency proportional to the rate of flow of fluid through said delivery line, (b) a fuel volume counting device adapted to produce an output signal in response to a predetermined number of input pulses from said transducer means, (c) price counting means responsive to output pulses from said fuel counting device for producing output pulses, the number of which increases as the monetary value of fuel delivered through said delivery line increases, (d) visual price indicating means, (e) and pulse motor means operable in response to the output pulses from said price counting means and operatively connected to said visual price indicating means for advancing the price displayed by said indicating means each time a pulse is received from the price counting means.

17. The combination of claim 16 including:

(a) a second pulse motor operatively connected to said visual price indicating means, (b) and means for driving said second pulse motor to reset the price indicating means to zero after one quantity of fuel is delivered through said delivery line and before the next successive quantity of fuel is delivered through the delivery line.

18. The combination of claim 16, (a) wherein a pulse is produced at the output of the price counting means each time an amount of fuel is delivered through the delivery line having a value equal to the smallest monetary unit displayed by said visual indicating means, (b) and wherein each pulse at the output of the price counting means advances the visual indicating means by said smallest monetary unit.

19. For use with a fuel dispensing system having a fuel supply and a fuel delivery line connected to the output of said supply means; the combination of:

(a) transducer means for producing electrical pulses having a frequency proportional to the rate of flow of fluid through the delivery line, (b) a plurality of binary counting devices each of which is adapted to produce an output pulse in response to a predetermined number of input pulses from said transducer means, (c) price counting means connected to the outputs of said binary counting devices for producing a pulsed output signal in which the number of pulses is indicative of the price of fuel delivered through said fuel delivery line, (d) visual price indicating means, (e) pulse-operated motor means operatively connected to said visual price indicating means whereby the price indicated by said visual indicating means will increase as the number of pulses applied to said motor means increases, (f) and means for applying the pulsed output signal from said price counting means to said pulse-operated motor means.

20. For use with a fuel dispensing system having a fuel supply means and a fuel delivery line connected to the output of said supply means; the combination of:

(a) transducer means for producing electrical pulses having a frequency proportional to the rate of flow of fluid through the delivery line, (b) a binary counting device adapted to produce an output pulse in response to a predetermined number of input pulses from said transducer means, the number of output pulses produced by said binary counting means being proportional to the volume of fuel delivered through said delivery line, (c) visual fuel volume indicating means,
(d) pulse-operated motor means operatively connected to said fuel volume indicating means whereby the volume indicated will be a function of the number of pulses applied to said motor means,
(e) and means for applying the output pulses from said binary counting device to said motor means.

References Cited by the Examiner

UNITED STATES PATENTS

| | | | |
|---|---|---|---|
| 2,530,113 | 11/50 | Bugg | 222—76 X |
| 2,540,617 | 2/51 | Hagard et al. | 222—20 X |
| 2,812,111 | 11/57 | Wright et al. | 222—76 |
| 2,825,773 | 3/58 | Avdeenko | 222—46 |
| 2,884,494 | 4/59 | Evangelista | 222—46 |
| 2,925,936 | 2/60 | Whitefield et al. | 222—20 |
| 2,928,572 | 3/60 | Markoff et al. | 222—35 |
| 2,996,221 | 8/61 | Grise | 222—26 |
| 3,027,043 | 3/62 | Rapisarda | 222—35 |
| 3,038,638 | 6/62 | Notter | 222—26 |
| 3,130,867 | 4/64 | Jackel | 222—20 |

LOUIS J. DEMBO, *Primary Examiner.*

LAVERNE D. GEIGER, *Examiner.*

UNITED STATES PATENT OFFICE
CERTIFICATE OF CORRECTION

Patent No. 3,199,727                                   August 10, 1965

Albert F. Romanowski

It is hereby certified that error appears in the above numbered patent requiring correction and that the said Letters Patent should read as corrected below.

Column 3, line 20, for "53" read -- 41 --; line 24, after "brand" insert -- of --; same column 3, line 27, for "transducer" read -- transducers --; column 4, line 12, for "casing" read -- casting --; line 40, for "actuating" read -- actuation --; line 42, for "indicator" read -- indicators --; same column 4, line 48, for "numreous" read -- numerous --; column 10, line 11, for "present" read -- preset --; line 26, after "is" insert -- 50 --; same column 10, line 58, for "363b" read -- 363a --; column 11, line 34, for "G6-and G11" read -- G6-G11 --; column 12, line 16, for "The" read -- These --; line 49, for "pulses" read -- pulse --; same column 12, line 62, for "input" read -- output --; column 13, line 7, strike out "at"; line 33, for "of" read -- or --.

Signed and sealed this 22nd day of March 1966.

(SEAL)
Attest:

ERNEST W. SWIDER                           EDWARD J. BRENNER
Attesting Officer                            Commissioner of Patents